United States Patent
Kikuchi

(10) Patent No.: US 12,552,698 B2
(45) Date of Patent: Feb. 17, 2026

(54) METHOD OF MOLDING OPTICAL ELEMENT AND MOLD FOR MOLDING OPTICAL ELEMENT

(71) Applicant: OLYMPUS CORPORATION, Tokyo (JP)

(72) Inventor: Kenji Kikuchi, Hino (JP)

(73) Assignee: OLYMPUS CORPORATION, Tokyo (JP)

(*) Notice: Subject to any disclaimer, the term of this patent is extended or adjusted under 35 U.S.C. 154(b) by 202 days.

(21) Appl. No.: 18/228,793

(22) Filed: Aug. 1, 2023

(65) Prior Publication Data
US 2023/0373840 A1   Nov. 23, 2023

Related U.S. Application Data

(63) Continuation of application No. PCT/JP2021/031422, filed on Aug. 26, 2021.

(51) Int. Cl.
*C03B 11/00* (2006.01)
*C03B 11/08* (2006.01)

(52) U.S. Cl.
CPC ............ *C03B 11/005* (2013.01); *C03B 11/08* (2013.01)

(58) Field of Classification Search
CPC .. C03B 11/08; C03B 2215/50; C03B 2215/72
See application file for complete search history.

(56) References Cited

U.S. PATENT DOCUMENTS

| | | | | |
|---|---|---|---|---|
| 4,325,734 A | * | 4/1982 | Burrage | ............... H01H 1/0203 |
| | | | | 419/48 |
| 2005/0162758 A1 | * | 7/2005 | Tanaka | .................. G02B 6/4206 |
| | | | | 359/811 |
| 2021/0002161 A1 | | 1/2021 | Kikuchi | |

FOREIGN PATENT DOCUMENTS

| CN | 108746606 A | | 11/2018 | |
|---|---|---|---|---|
| JP | H05139765 A | * | 6/1993 | ............. C03B 11/08 |
| JP | 2002-012431 A | | 1/2002 | |
| JP | 2002020130 A | * | 1/2002 | ............. C03B 11/08 |
| JP | 2003-292327 A | | 10/2003 | |
| JP | 2005145777 A | * | 6/2005 | ............. C03B 11/08 |
| JP | 2006-213557 A | | 8/2006 | |

(Continued)

OTHER PUBLICATIONS

International Search Report dated Oct. 26, 2023 received in PCT/JP2021/031422.

(Continued)

*Primary Examiner* — Erin Snelting
*Assistant Examiner* — Steven S Lee
(74) *Attorney, Agent, or Firm* — Scully, Scott, Murphy & Presser, P.C.

(57) ABSTRACT

Provided is a method of molding an optical element. The method includes: inserting a neck portion provided in each of an upper mold and a lower mold into a hole portion provided in a side surface mold; replacing an atmosphere in the hole portion of the side surface mold with an inert gas through a groove communicating between either an upper end surface or a lower end surface of the side surface mold and the hole portion of the side surface mold; heating a molding material disposed in the hole portion of the side surface mold; and bringing the upper mold and the side surface mold, and the lower mold relatively close to each (Continued)

other to press molding the molding material to obtain an optical element.

6 Claims, 6 Drawing Sheets

(56) References Cited

FOREIGN PATENT DOCUMENTS

| | | | | |
|---|---|---|---|---|
| JP | 2006-273650 A | | 10/2006 | |
| JP | 2007246338 A | * | 9/2007 | ........... C03B 11/005 |
| JP | 2007332005 A | * | 12/2007 | ............. C03B 11/08 |
| JP | 2008183754 A | * | 8/2008 | |
| JP | 2019-178041 A | | 10/2019 | |
| JP | 2020142939 A | * | 9/2020 | ............. C03B 11/08 |
| WO | WO-2008053860 A1 | * | 5/2008 | ........... C03B 11/005 |
| WO | WO-2019058862 A1 | * | 3/2019 | ............... G02B 3/00 |

OTHER PUBLICATIONS

Chinese Office Action dated Jun. 14, 2025 received in 202180096546.X.

* cited by examiner

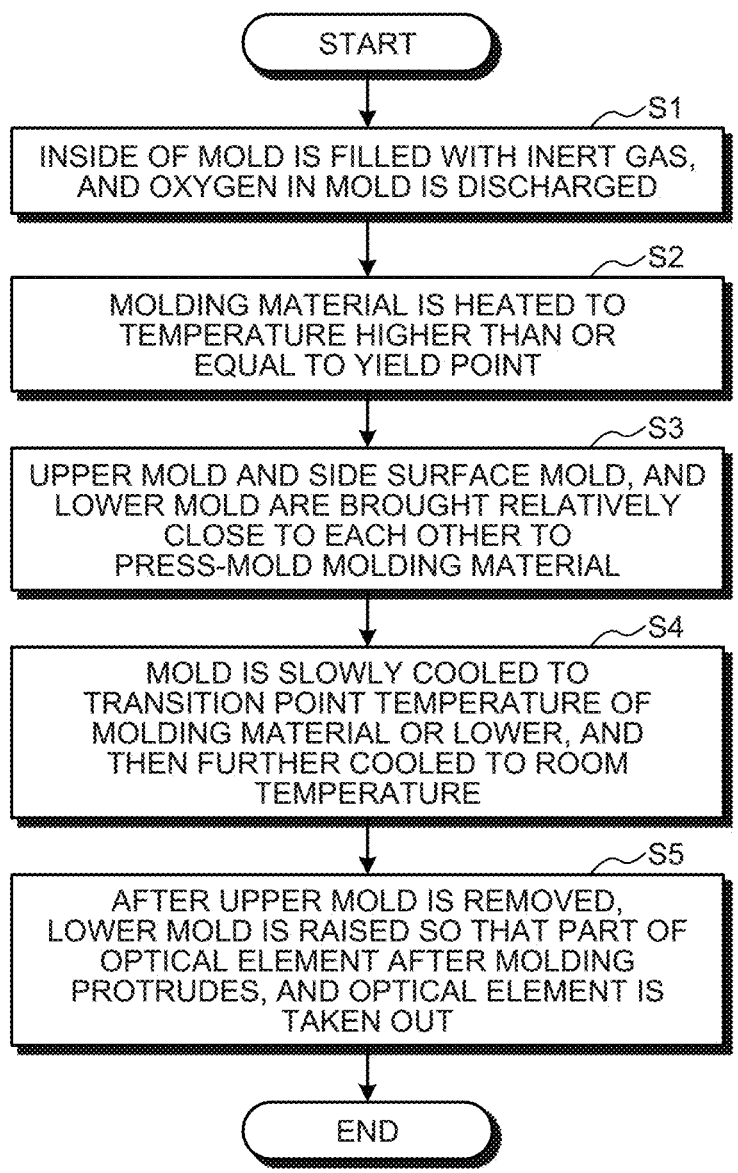

METHOD OF MOLDING OPTICAL ELEMENT AND MOLD FOR MOLDING OPTICAL ELEMENT

CROSS-REFERENCE TO RELATED APPLICATION

This application is a continuation of International Application No. PCT/JP2021/031422, filed on Aug. 26, 2021, the entire contents of which are incorporated herein by reference.

BACKGROUND

1. Technical Field

The present disclosure relates to a method of molding an optical element and a mold for molding an optical element.

2. Related Art

As one method of molding an optical element such as a glass lens, for example, as shown in JP 2003-292327 A, a molding method is known in which a glass material (molding material) is heated and press-molded by a mold, and a shape of the mold is transferred to the glass material. In such a method of molding an optical element, not only optical functional surfaces provided on upper and lower surfaces of the optical element but also a side surface are collectively formed, so that the cost including subsequent processes can be reduced.

SUMMARY

In some embodiments, provided is a method of molding an optical element. The method includes: inserting a neck portion provided in each of an upper mold and a lower mold into a hole portion provided in a side surface mold; replacing an atmosphere in the hole portion of the side surface mold with an inert gas through a groove communicating between either an upper end surface or a lower end surface of the side surface mold and the hole portion of the side surface mold; heating a molding material disposed in the hole portion of the side surface mold; and bringing the upper mold and the side surface mold, and the lower mold relatively close to each other to press molding the molding material to obtain an optical element.

In some embodiments, provided is a mold for molding an optical element. The mold includes: an upper mold and a lower mold each including a neck portion; a side surface mold provided with a hole portion into which the neck portion of the upper mold and the neck portion of the lower mold are inserted; and a groove formed between either an upper end surface or a lower end surface of the side surface mold and the hole portion of the side surface mold, the groove being configured to introduce an inert gas into the hole portion of the side surface mold.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 6 is a flowchart illustrating a method of molding an optical element using the mold for molding an optical element according to the embodiment of the disclosure.

DETAILED DESCRIPTION

Hereinafter, embodiments of a method of molding an optical element and a mold for molding an optical element according to the disclosure will be described with reference to the drawings. Note that the disclosure is not limited to the following embodiments, and constituent elements in the following embodiments include those that can be easily replaced by those skilled in the art or those that are substantially the same.

Configuration of Molding Device

Figure 1:
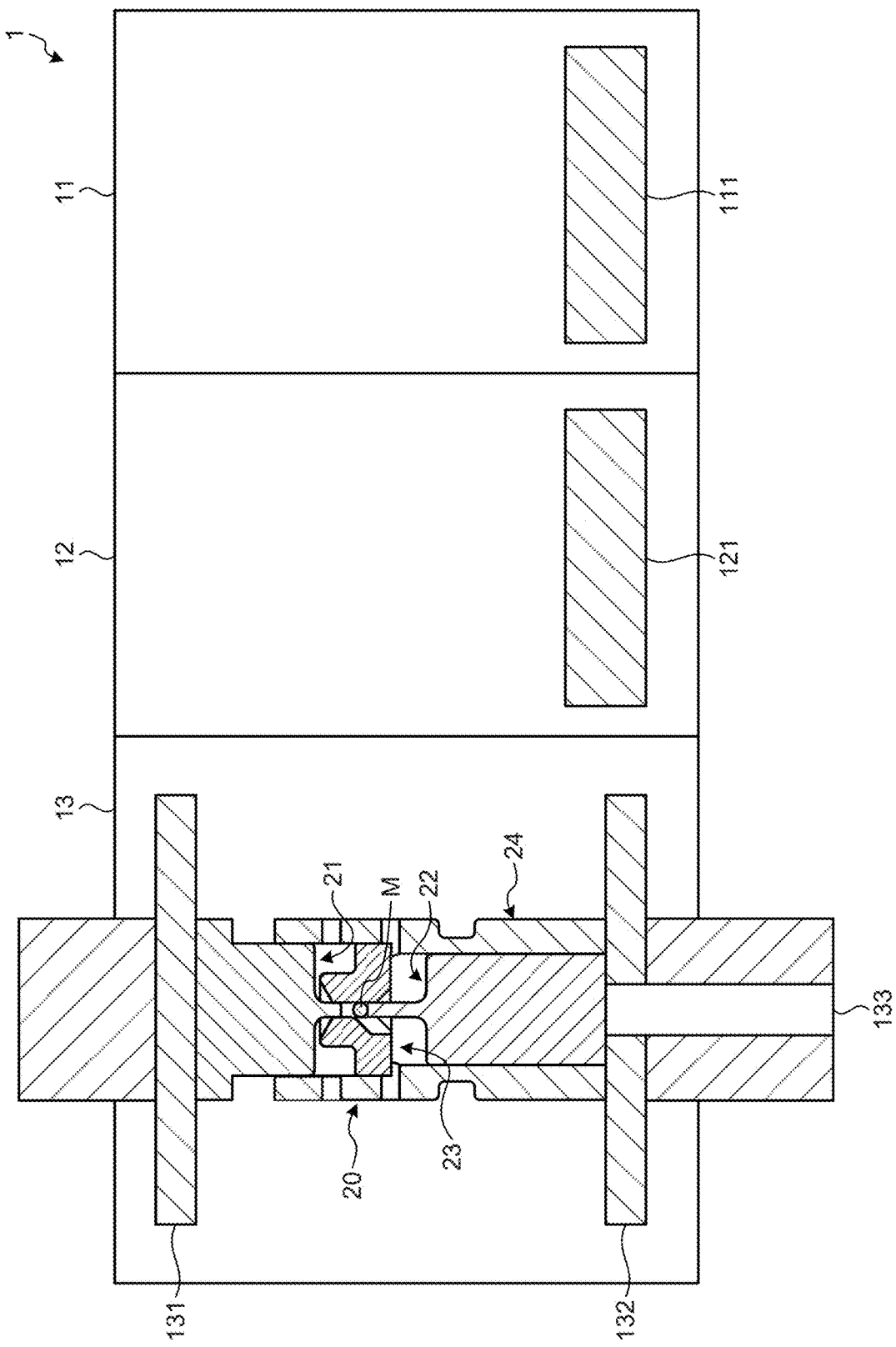
FIG. 1 is a cross-sectional view illustrating a configuration of a main part of a molding device including a mold for molding an optical element according to an embodiment of the disclosure.

A molding device 1 molds an optical element (for example, a glass lens) by press molding a molding material (for example, a glass material) M that has been heated and softened. As illustrated in FIG. 1, the molding device 1 mainly includes a mold supply unit 11, a gas replacement unit 12, and a molding unit 13.

The mold supply unit 11 performs a mold supply step of supplying a mold 20 before molding to the molding device 1 and a mold discharge step of discharging the mold 20 after molding from the molding device 1. The mold supply unit 11 is provided with a placement portion 111 for placing the mold 20 conveyed by a conveyance mechanism (not illustrated).

In the gas replacement unit 12, a gas replacement step of discharging oxygen inside the mold 20 and replacing an atmosphere inside the mold 20 with an inert gas such as nitrogen is performed. The gas replacement unit 12 is provided with a placement portion 121 for placing the mold 20 conveyed by a conveyance mechanism (not illustrated). Note that the "inside of the mold 20" specifically refers to an inside of a hole portion 231 of a side surface mold 23, and more specifically refers to a molding space formed by a side surface molding surface, an upper surface molding surface 212 of an upper mold 21, and a lower surface molding surface 222 of a lower mold 22, the side surface molding surface including a part of an inner surface of the hole portion 231 of the side surface mold 23 (see FIG. 2).

In the molding unit 13, a heating step, a press molding step, and a cooling step are performed. The molding unit 13 is provided with an upper plate 131 and a lower plate 132 for sandwiching and heating and pressing the mold 20 that has been conveyed by a conveyance mechanism (not illustrated). The upper plate 131 and the lower plate 132 are provided with a heating mechanism and a cooling mechanism (not illustrated), respectively. Furthermore, the lower plate 132 is provided with a pressing mechanism (pressing pin) 133 for pressing the lower mold 22 in the press molding step.

Configuration of Mold

A configuration of the mold (mold for molding an optical element) 20 according to an embodiment of the disclosure will be described with reference to FIGS. 2 and 3. The mold 20 includes the upper mold 21, the lower mold 22, the side surface mold 23, a sleeve 24, and a spacer 25.

The upper mold 21 includes a cylindrical neck portion 211 extending toward the lower mold 22. In the upper mold 21, the neck portion 211 is a portion to be inserted into the hole portion 231 of the side surface mold 23. An end portion of the neck portion 211 has the upper surface molding surface 212 for forming an upper optical functional surface of the optical element.

The lower mold 22 includes a cylindrical neck portion 221 extending toward the upper mold 21. In the lower mold 22, the neck portion 221 is a portion to be inserted into the hole portion 231 of the side surface mold 23. An end portion of the neck portion 221 has the lower surface molding surface 222 for forming a lower optical functional surface of the optical element.

The side surface mold 23 is provided with the hole portion 231 vertically penetrating the side surface mold 23. A part of the inner surface of the hole portion 231 constitutes a side surface molding surface for forming a side surface of the optical element. The upper mold 21 and the lower mold 22 are disposed at positions where molding surfaces thereof face each other across the side surface mold 23. Furthermore, the upper mold 21, the lower mold 22, and the side surface mold 23 are disposed inside the sleeve 24.

A tapered portion 232 is formed on an upper end surface of the side surface mold 23. The tapered portion 232 functions as a guide portion for facilitating insertion of the neck portion 211 of the upper mold 21 into the hole portion 231 of the side surface mold 23. Furthermore, a tapered portion 233 is formed on a lower end surface of the side surface mold 23. The tapered portion 233 functions as a guide portion for facilitating insertion of the neck portion 221 of the lower mold 22 into the hole portion 231 of the side surface mold 23.

A groove 234 is formed in the side surface mold 23. The groove 234 is for introducing an inert gas into the hole portion 231 of the side surface mold 23 in the gas replacement step in the method of molding an optical element, and is formed by, for example, electrical discharge machining or the like.

The groove 234 is provided between the lower end surface of the side surface mold 23 and the hole portion 231. That is, the groove 234 communicates between the lower end surface of the side surface mold 23 and the hole portion 231. Furthermore, one end of the groove 234 communicates with the tapered portion 233 on the lower side of the side surface mold 23. Furthermore, another end of the groove 234 communicates with the hole portion 231 of the side surface mold 23. As a result, as indicated by broken line arrow A in FIG. 2, in the gas replacement step, the inert gas taken in from a vent hole 242 on the lower side of the sleeve 24 is introduced into the hole portion 231 of the side surface mold 23 through the groove 234, and the atmosphere in the hole portion 231 is replaced with the inert gas.

Furthermore, the groove 234 is provided at a position avoiding the side surface molding surface for forming the side surface of the optical element. That is, an opening (end portion) of the groove 234 in the inner peripheral surface of the hole portion 231 is formed at a position different from the side surface molding surface provided on the inner peripheral surface of the hole portion 231.

Here, the side surface molding surface indicates a part of the inner surface of the hole portion 231 of the side surface mold 23. In the press molding step in the method of molding an optical element, as illustrated in FIG. 3, the lower mold 22 is brought close to the upper mold 21 and the side surface mold 23 to press-mold the molding material M. Then, the groove 234 is provided in the inner surface of the hole portion 231 of the side surface mold 23 at a position at which the molding material M does not come into contact with the groove 234 during press molding. As described above, by providing the groove 234 at a position at which the molding material M does not come into contact with the groove 234 during the press molding, gas replacement can be performed without adversely affecting the press molding step of the subsequent step.

Note that the groove 234 may be formed at a different position in accordance with a route through which an inert gas is introduced. For example, in FIG. 2, the groove 234 is provided between the lower end surface of the side surface mold 23 and the hole portion 231 in order to introduce an inert gas from the vent hole 242 on the lower side of the sleeve 24. On the other hand, for example, when an inert gas is introduced from a vent hole 241 on the upper side of the sleeve 24, it is desirable to provide the groove 234 between the upper end surface of the side surface mold 23 and the hole portion 231. As described above, by providing the groove 234 at a position corresponding to the path for introducing the inert gas, for example, gas replacement can be smoothly performed in the gas replacement step.

Furthermore, the groove 234 may be provided at a plurality of positions in the side surface mold 23. For example, in FIG. 2, one groove 234 is provided on the left side of the hole portion 231 in the cross-sectional view, but a plurality of the groove 234 may be provided on the left side of the hole portion 231, or one or a plurality of groove 234 may be provided on the right side of the hole portion 231. By providing the plurality of groove 234 in the side surface mold 23, for example, in the gas replacement step, the time required for gas replacement can be shortened.

The sleeve 24 is for accommodating the upper mold 21, the lower mold 22 and the side surface mold 23 therein. The sleeve 24 is formed in a cylindrical shape. Furthermore, the sleeve 24 includes the vent holes 241 and 242 for communicating between the inside and the outside of the sleeve 24 and for introducing an inert gas into the mold 20 in the gas replacement step of the method of molding an optical element described later.

The spacer 25 is for supporting the upper mold 21 so as not to fall when the mold 20 is assembled before molding. In the mold supply step, the gas replacement step, and the heating step, each processing is performed in a state where the spacer 25 is attached to the mold 20, and in the steps after the heating step, each processing is performed in a state where the spacer 25 is removed from the mold 20.

Assembling Step of Mold

Hereinafter, an assembling step of the mold 20 before molding will be described. First, the lower mold 22 and the side surface mold 23 are incorporated into the sleeve 24. Specifically, the side surface mold 23 is disposed on a step portion provided inside the sleeve 24, and the lower mold 22 is disposed such that the lower end surface of the lower mold 22 is flush with the lower end surface of the sleeve 24. Furthermore, the neck portion 221 of the lower mold 22 is inserted into the hole portion 231 of the side surface mold 23.

Subsequently, the molding material M is disposed on the lower surface molding surface 222 of the lower mold 22. Note that, in FIG. 2, the spherical molding material M is illustrated, but the molding material M is not limited to a spherical shape, and may be, for example, a substantially spherical pellet shape, a lens shape processed into an approximate spherical shape in advance, or the like.

Furthermore, the molding material M is processed to have a diameter smaller than an inner diameter of the hole portion 231 for the purpose of enabling press molding by the upper mold 21 and the lower mold 22 inside the hole portion 231 of the side surface mold 23. Thus, when the molding material M is inserted into the hole portion 231, a predetermined gap is formed between the molding material M and a part (side surface molding surface) of the inner surface of the hole portion 231.

Subsequently, the upper mold 21 is incorporated into the sleeve 24. Specifically, the upper mold 21 is disposed on the upper end surface of the sleeve 24, and the neck portion 211 of the upper mold 21 is inserted into the hole portion 231 of the side surface mold 23.

The neck portion 221 of the lower mold 22 is formed to have a length equal to or longer than a length of the hole portion 231 of the side surface mold 23, for example. Note that the above-described "equal" includes a state in which the length of the neck portion 221 of the lower mold 22 is the same as the length of the hole portion 231 of the side surface mold 23, a state in which the length of the neck portion 221 of the lower mold 22 is slightly shorter than the length of the hole portion 231 of the side surface mold 23, and a state in which the length of the neck portion 221 of the lower mold 22 is slightly longer than the length of the hole portion 231 of the side surface mold 23.

As a result, in a taking-out step in the method of molding an optical element to be described later, by raising the lower mold 22 with respect to the side surface mold 23 in a state where the upper mold 21 is removed (see FIG. 5), a position of the lower surface molding surface 222 is raised to a position above the position of the lower surface molding surface 222 during the press molding (see FIG. 4). Then, the end portion of the neck portion 221 of the lower mold 22 rises to substantially the same height as an opening of the hole portion 231 of the side surface mold 23 or to a position higher than the opening of the hole portion 231 of the side surface mold 23.

Method of Molding Optical Element

Hereinafter, a method of molding an optical element using the mold 20 will be described with reference to FIGS. 1 to 6. In the method of molding an optical element according to the present embodiment, the neck portions 211 and 221 respectively provided in the upper mold 21 and the lower mold 22 are inserted into the hole portion 231 provided in the side surface mold 23, and then the optical element is molded from the molding material M by the upper surface molding surface 212 provided in the upper mold 21, the lower surface molding surface 222 provided in the lower mold 22, and the side surface molding surface including a part of the inner surface of the hole portion 231 of the side surface mold 23.

In the method of molding an optical element, the mold 20 before usage (see FIG. 2) assembled outside the molding device 1 is supplied to the mold supply unit 11 of the molding device 1, and then the gas replacement step is performed by the gas replacement unit 12. After the heating step, the press molding step, and the cooling step are performed in the molding unit 13, the mold 20 after molding is discharged from the mold supply unit 11, and the taking-out step is performed outside the molding device 1. Note that conveyance between the mold supply unit 11, the gas replacement unit 12, and the molding unit 13 is performed by a conveyance mechanism (for example, an arm) (not illustrated). Hereinafter, specific contents of each step will be described with reference to FIGS. 2 to 6.

Gas Replacement Step

In the gas replacement step, the inside of the mold 20 conveyed to the gas replacement unit 12 is filled with an inert gas such as nitrogen, and oxygen in the mold is discharged (See Step S1 in FIG. 6). Specifically, in the gas replacement step, the atmosphere in the hole portion 231 of the side surface mold 23 is replaced with an inert gas through the groove 234 (the groove 234 communicating between the lower end surface of the side surface mold 23 and the hole portion 231) provided in the side surface mold 23. Note that in the gas replacement step, in order to ensure inert gas replacement, the atmospheric pressure of the gas replacement unit 12 may be reduced by a vacuum pump (not illustrated) before replacement with an inert gas, and then the inert gas may be filled.

Heating Step

In the heating step, the mold 20 conveyed to the molding unit 13 is sandwiched between the upper plate 131 and the lower plate 132, and the molding material M disposed in the hole portion 231 of the side surface mold 23 is heated to a temperature higher than or equal to a yield point of the molding material M (See Step S2 in FIG. 6).

Press Molding Step

In the press molding step, the upper mold 21 and the side surface mold 23, and the lower mold 22 are brought relatively close to each other to press-mold the molding material M (See Step S3 in FIG. 6). In the press molding step, specifically, as illustrated in FIGS. 3 and 4, the pressing mechanism 133 (see FIG. 1) of the molding device 1 is raised to raise the lower mold 22 and the molding material M. As a result, the upper surface molding surface 212 and the lower surface molding surface 222 form an upper and lower optical functional surfaces of an optical element o inside the hole portion 231 of the side surface mold 23, and a part of the inner surface of the hole portion 231 (the side surface molding surface) forms a side surface of the optical element O.

Furthermore, the groove 234 of the side surface mold 23 is provided at a position avoiding the side surface molding surface, that is, a part of the inner surface of the hole portion 231. Therefore, in the press molding step, as illustrated in FIGS. 3 and 4, press molding is performed at a position above the groove 234 of the side surface mold 23.

Cooling Step

In the cooling step, the mold 20 is slowly cooled to a transition point temperature of the molding material M or lower, and then further cooled to room temperature (See Step S4 in FIG. 6).

Taking-Out Step

Figure 5:
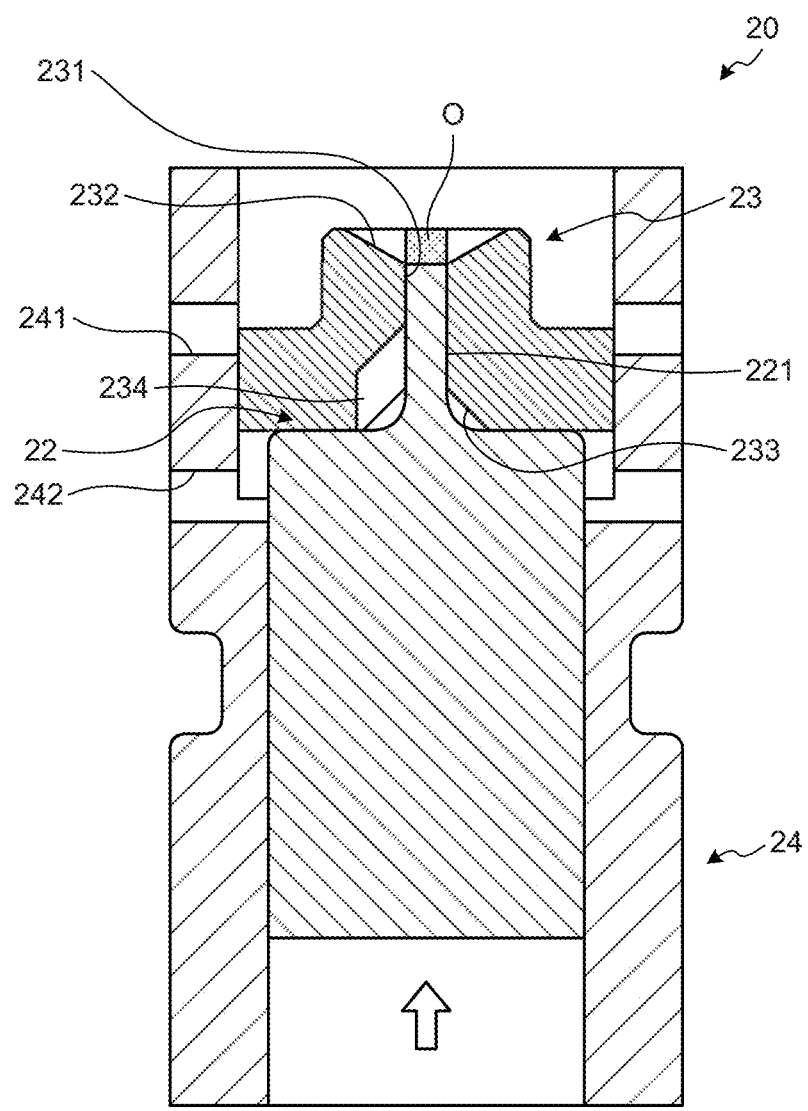
FIG. 5 is a diagram illustrating a state of a mold for molding an optical element during a taking-out step in the method of molding an optical element according to the embodiment of the disclosure.

In the taking-out step, as illustrated in FIG. 5, after the upper mold 21 is removed from the side surface mold 23, the lower mold 22 is raised by the pressing mechanism 133 (See FIG. 1), so that a part of the optical element O after molding protrudes from the upper end portion of the side surface mold 23, and the optical element O is taken out (See Step S5 in FIG. 6). In the taking-out step, as illustrated in the drawing, the optical element O protruding from the upper end portion of the side surface mold 23 is sucked and taken out by a suction jig or the like.

Figure 2:
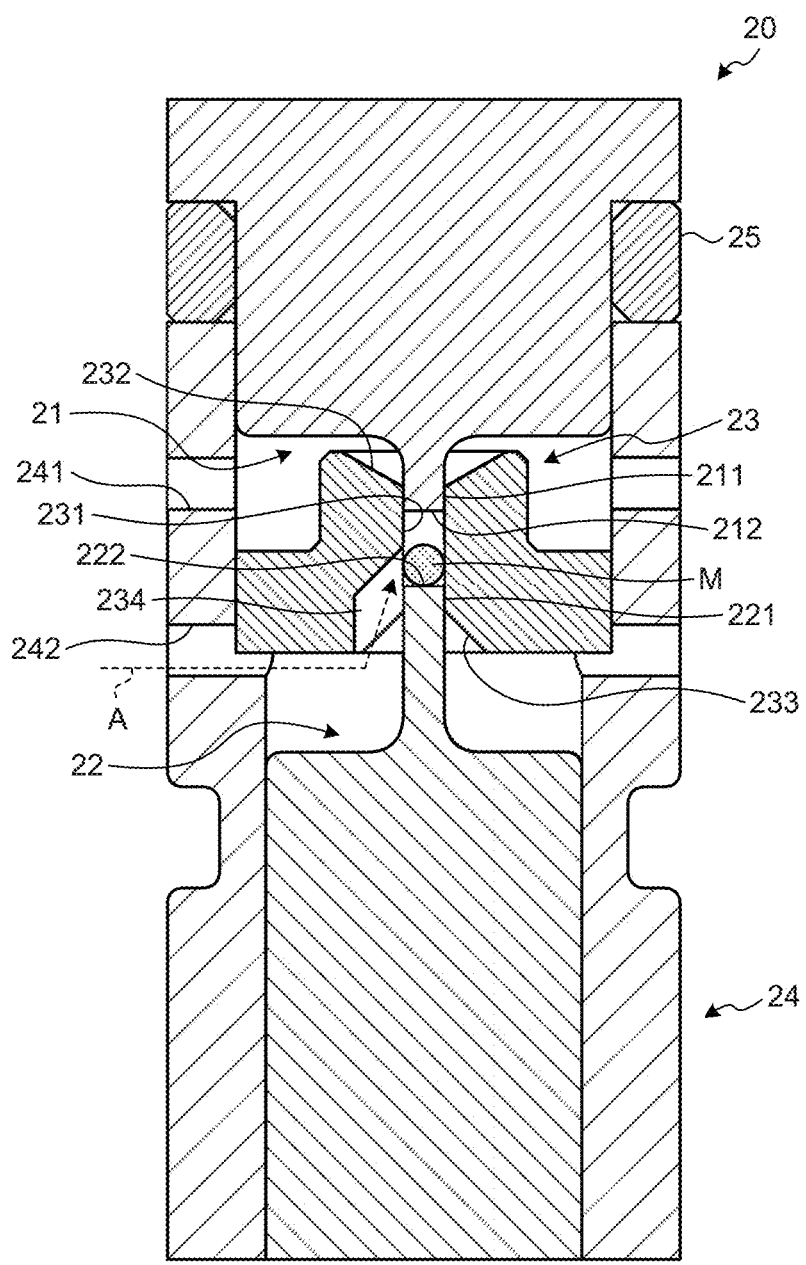
FIG. 2 is a cross-sectional view illustrating a configuration of the mold for molding an optical element according to the embodiment of the disclosure.
Figure 3:
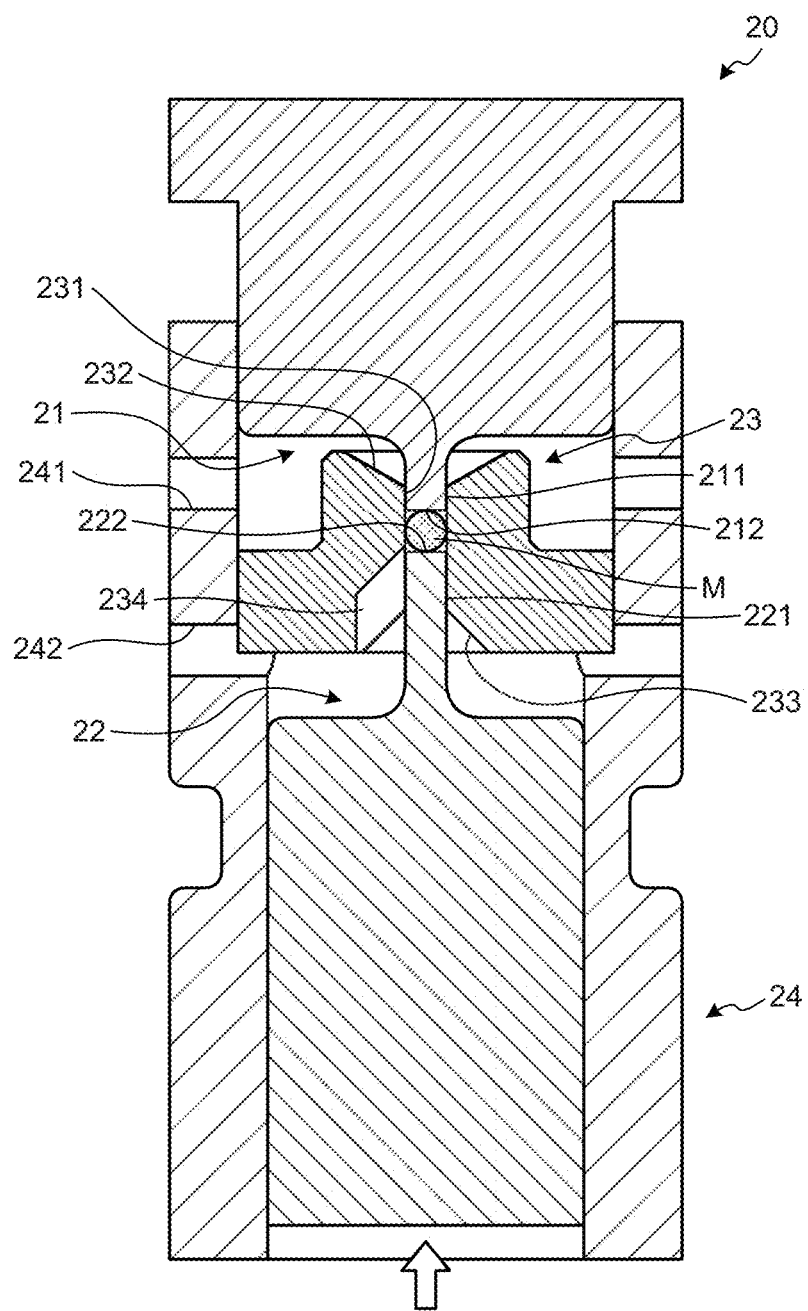
FIG. 3 is a diagram illustrating a state of a mold for molding an optical element during a press molding step in a method of molding an optical element according to the embodiment of the disclosure.

According to the method of molding an optical element and the mold for molding an optical element as described above, even in a state where the neck portion 211 of the upper mold 21 and the neck portion 221 of the lower mold 22 are inserted in advance into the hole portion 231 of the side surface mold 23, as illustrated in FIG. 2, the atmosphere inside the mold 20 can be replaced with the inert gas through the groove 234 provided in the side surface mold 23. Furthermore, according to the method of molding an optical element and the mold for molding an optical element, it is possible to collectively form the optical functional surface and the side surface of the optical element O while discharging oxygen inside the mold 20 and replacing the oxygen with an inert gas by a simple configuration in which the lower mold 22 is only driven while the upper mold 21 and the side surface mold 23 are placed and fixed on the sleeve 24.

Figure 4:
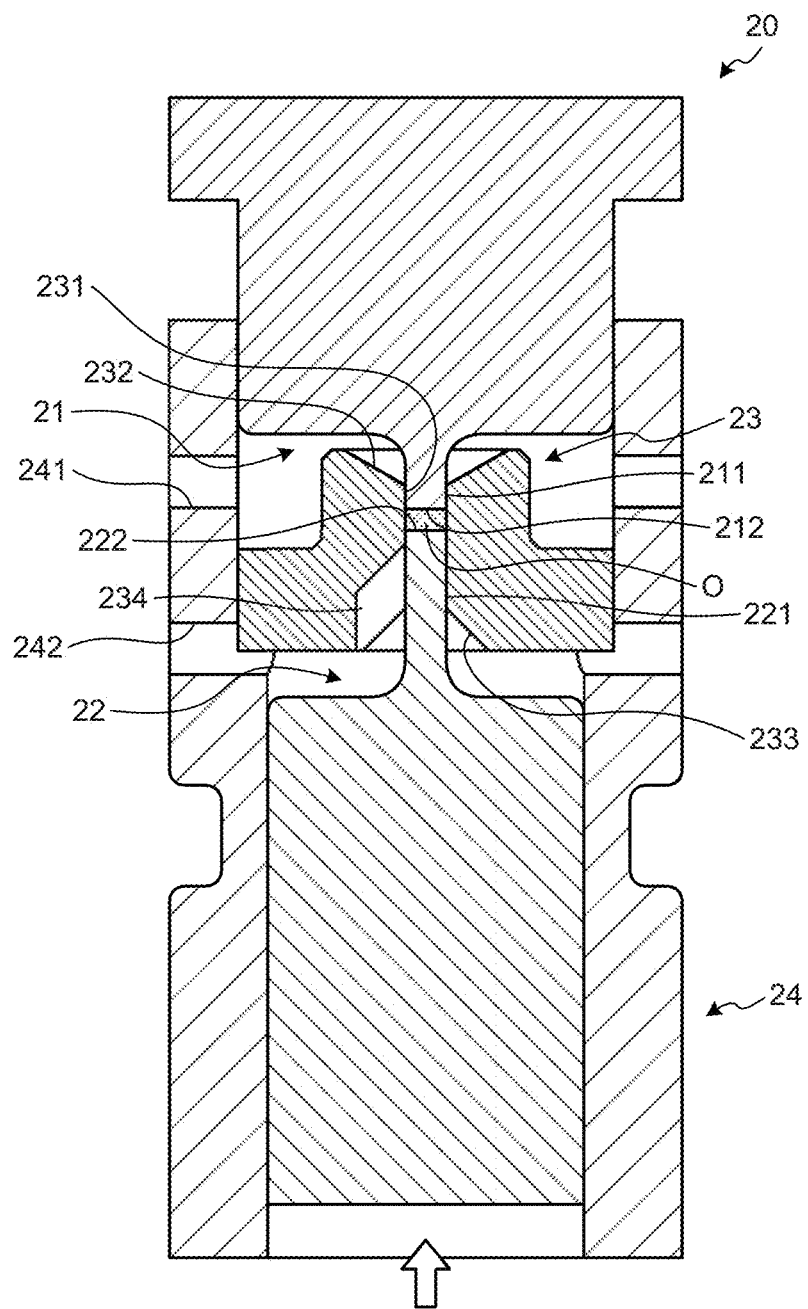
FIG. 4 is a diagram illustrating a state of a mold for molding an optical element during a press molding step in the method of molding an optical element according to the embodiment of the disclosure.

Furthermore, in the method of molding an optical element and the mold for molding an optical element, as illustrated in FIGS. 4 and 5, since the lower surface molding surface 222 of the lower mold 22 is accommodated in the hole portion 231 of the side surface mold 23 even after the press molding is completed, the optical element O after molding does not protrude or fall from the lower surface molding surface 222. This effect can be obtained regardless of a thickness of the optical element O after molding (even if the optical element O is thin).

According to a method of molding an optical element and a mold for molding an optical element according to the disclosure, even in a state where the neck portion of the upper mold is inserted in advance into the hole portion of the side surface mold, the atmosphere inside the mold can be replaced with the inert gas through the groove provided in the side surface mold. This makes it possible to collectively form the optical functional surface and the side surface of the optical element while discharging oxygen inside the mold and replacing it with an inert gas with a simple configuration in which only the groove is provided in the side surface mold.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mold for molding an optical element, the mold comprising:
   an upper mold having an upper neck portion including an upper surface molding surface and a lower mold having a lower neck portion including a lower surface molding surface, the upper surface molding surface and the lower surface molding surface being separated from each other prior to molding and being configured to further approach each other during molding;
   a side surface mold provided with a hole portion into which the neck portion of the upper mold and the neck portion of the lower mold are to be inserted wherein the side surface mold includes a tapered portion on a lower end surface; and
   a groove formed between either an upper end surface or a the lower end surface of the side surface mold and the hole portion of the side surface mold, the groove being configured to introduce an inert gas into the hole portion of the side surface mold, wherein the groove includes an opening in an inner peripheral surface of the hole portion and the groove has one end communicating with the tapered portion of the side surface mold and another end communicating with the hole portion of the side surface mold, and
   the opening is positioned such that prior to molding, the neck portion of the upper mold and the neck portion of the lower mold do not face the opening, and during molding, either the neck portion of the upper mold or the neck portion of the lower mold faces the opening.

2. The mold according to claim 1, wherein the opening is provided at a position avoiding a side surface molding surface configured to form a side surface of the optical element.

3. The mold according to claim 1, wherein the opening is formed at a position different from a side surface molding surface that is provided in the inner peripheral surface of the hole portion, the side surface molding surface being configured to form a side surface of the optical element.

4. The mold according to claim 1, wherein the side surface mold includes a tapered portion on the upper end surface.

5. The mold according to claim 1, wherein the neck portion of the lower mold has a length equal to or longer than a length of the hole portion of the side surface mold.

6. The mold according to claim 1, further comprising
   a sleeve configured to accommodate the upper mold, the lower mold and the side surface mold,
   wherein the sleeve includes a vent hole configured to communicate between an inside and an outside of the sleeve and introduce the inert gas into the hole portion of the side surface mold via the groove.

* * * * *